(12) United States Patent
Deka et al.

(10) Patent No.: US 11,953,141 B2
(45) Date of Patent: *Apr. 9, 2024

(54) PROCESSES FOR MAKING A SUPER-INSULATING CORE MATERIAL FOR A VACUUM INSULATED STRUCTURE

(71) Applicant: WHIRLPOOL CORPORATION, Benton Harbor, MI (US)

(72) Inventors: Lakshya J. Deka, Mishawaka, IN (US); Nicole M. Ernat, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,128

(22) Filed: Apr. 18, 2023

(65) Prior Publication Data

US 2023/0250917 A1 Aug. 10, 2023

Related U.S. Application Data

(63) Continuation of application No. 17/747,079, filed on May 18, 2022, now Pat. No. 11,674,632, which is a (Continued)

(51) Int. Cl.
*F16L 59/02* (2006.01)
*C04B 14/06* (2006.01)
(Continued)

(52) U.S. Cl.
CPC .......... *F16L 59/028* (2013.01); *C04B 14/062* (2013.01); *C04B 24/34* (2013.01); (Continued)

(58) Field of Classification Search
None
See application file for complete search history.

(56) References Cited

U.S. PATENT DOCUMENTS 2,691,248 A 10/1954 Ford
3,207,588 A 9/1965 Slayter et al.
(Continued)

FOREIGN PATENT DOCUMENTS

DE 1496598 A1 8/1969
EP 2889526 7/2015
(Continued)

*Primary Examiner* — John J Figueroa
(74) *Attorney, Agent, or Firm* — Price Heneveld LLP

(57) ABSTRACT

A method for forming a super-insulating material for a vacuum insulated structure includes disposing glass spheres within a rotating drum. A plurality of interstitial spaces are defined between the glass spheres. A binder material is disposed within the rotating drum. The glass spheres and the at least one binder material are rotated within the rotating drum, wherein the binder material is mixed during a first mixing stage with the glass spheres. A first insulating material is disposed within the rotating drum. The binder material, the first insulating material and the glass spheres are mixed to define an insulating base. A second insulating material is disposed within the rotating drum. The secondary insulating material is mixed with the insulating base to define a homogenous form of the super-insulating material, wherein the first and second insulating materials occupy substantially all of the interstitial spaces.

20 Claims, 9 Drawing Sheets

Related U.S. Application Data continuation of application No. 16/305,254, filed as application No. PCT/US2017/021068 on Mar. 7, 2017, now Pat. No. 11,365,843.

(51) Int. Cl.
*C04B 24/34* (2006.01)
*F16L 59/065* (2006.01)
*F25D 23/06* (2006.01)

(52) U.S. Cl.
CPC ............ *F16L 59/065* (2013.01); *F25D 23/06* (2013.01); *C04B 2235/528* (2013.01); *F25D 2201/14* (2013.01)

(56) References Cited

U.S. PATENT DOCUMENTS

| | | | |
|---|---|---|---|
| 3,510,392 A | 5/1970 | D'Eustachio | |
| 4,303,730 A | 12/1981 | Torobin | |
| 4,769,057 A | 9/1988 | Smolenski | |
| 5,171,346 A | 12/1992 | Hallett | |
| 5,665,787 A | 9/1997 | Nowak et al. | |
| 6,284,809 B1 | 9/2001 | Plummer et al. | |
| 7,763,350 B2 | 7/2010 | Desai et al. | |
| 9,115,025 B2 | 8/2015 | Bauer et al. | |
| 9,506,244 B2 | 11/2016 | Goletto et al. | |
| 11,162,630 B2 | 11/2021 | Deka et al. | |
| 11,365,843 B2 * | 6/2022 | Deka | .................... C04B 14/062 |
| 11,674,632 B2 * | 6/2023 | Deka | .................... C04B 14/062 |
| | | | 427/381 |
| 2004/0077738 A1 | 4/2004 | Field et al. | |
| 2010/0003506 A1 | 1/2010 | Desai et al. | |
| 2010/0146992 A1 | 6/2010 | Miller | |
| 2013/0255304 A1 | 10/2013 | Cur et al. | |
| 2015/0247270 A1 | 9/2015 | Thaxton et al. | |
| 2016/0340256 A1 | 11/2016 | Oribe et al. | |
| 2019/0144343 A1 * | 5/2019 | Deka | ........................ C03C 17/25 |
| | | | 428/76 |
| 2021/0323200 A1 * | 10/2021 | Naik | ........................ B29C 70/58 |
| 2022/0275902 A1 | 9/2022 | Deka et al. | |

FOREIGN PATENT DOCUMENTS

| | | | |
|---|---|---|---|
| EP | 3387344 | 10/2018 | |
| JP | 2001116443 | 4/2001 | |
| RU | 2187433 | 8/2002 | |
| RU | 2529525 | 9/2014 | |
| WO | 2009013106 | 1/2009 | |
| WO | 2018063173 | 4/2018 | |
| WO | WO-2018063173 A1 * | 4/2018 | ........... C03C 17/001 |

\* cited by examiner

PROCESSES FOR MAKING A SUPER-INSULATING CORE MATERIAL FOR A VACUUM INSULATED STRUCTURE

CROSS-REFERENCE TO RELATED APPLICATION

The present application is a continuation of U.S. patent application Ser. No. 17/747,079 filed May 18, 2022, now U.S. Pat. No. 11,674,632, which is a continuation of U.S. patent application Ser. No. 16/305,254 filed Nov. 28, 2018, now U.S. Pat. No. 11,365,843, which is a national stage entry of PCT/US2017/021068 filed Mar. 3, 2017, all of which are entitled PROCESSES FOR MAKING A SUPER-INSULATING CORE MATERIAL FOR A VACUUM INSULATED STRUCTURE, the entire disclosures of which are hereby incorporated herein by reference.

FIELD OF THE DEVICE

The device is in the field of insulating materials for appliances, and more specifically, various processes for making super-insulating core materials having coatings for reduced compressibility that can be included within a vacuum insulated structure for various appliances.

SUMMARY

In at least one aspect, a method for forming a super-insulating material for a vacuum insulated structure for an appliance includes disposing glass spheres within a rotating drum, wherein a plurality of interstitial spaces are defined between the glass spheres. At least one binder material is disposed within the rotating drum. The glass spheres and the at least one binder material are rotated within the rotating drum, wherein the at least one binder material is mixed during a first mixing stage with the glass spheres to partially occupy the interstitial spaces. A first insulating material is disposed within the rotating drum. The at least one binder material, the first insulating material and the glass spheres are mixed to define an insulating base. A second insulating material is disposed within the rotating drum. The secondary insulating material is mixed with the insulating base to define a homogenous form of the super-insulating material, wherein the first and second insulating materials occupy substantially all of an interstitial volume defined by the interstitial spaces.

In at least another aspect, a method for forming a super-insulating material for a vacuum insulated structure for an appliance includes disposing glass spheres within a rotating drum, wherein a plurality of interstitial spaces are defined between the glass spheres. A resin-based binding material is disposed within the rotating drum. The glass spheres and the resin-based binding material are mixed during a first mixing stage to define an adhering base material, wherein the interstitial spaces of the glass spheres are partially occupied by the resin-based binding material. A first insulating material is disposed within the rotating drum. The adhering base material is mixed with the first insulating material to define an aggregate material. The aggregate material is crushed during a crushing stage to define an insulating base. A second insulating material is disposed within the rotating drum. The second insulating material is mixed with the insulating base to define a homogenous form of the super-insulating material, wherein the first and second insulating materials substantially occupy substantially all of an interstitial volume defined by the plurality of interstitial spaces.

In at least another aspect, a method for forming a super-insulating material for a vacuum insulated structure for an appliance includes steps of disposing hollow glass spheres within a rotating drum, wherein a plurality of interstitial spaces are defined between the hollow glass spheres. A wax-based binder material is disposed within the rotating drum. The hollow glass spheres and the wax-based binder material are disposed within the rotating drum, wherein the wax-based binder material is mixed during a first mixing stage with the hollow glass spheres to partially occupy the interstitial spaces and define an adhering base material. A first insulating material is disposed within the rotating drum. The adhering base material is mixed with the first insulating material to define an insulating base. A second insulating material is disposed within the rotating drum. The secondary insulating material is mixed with the insulating base to define a homogenous form of the super-insulating material, wherein the first and second insulating materials occupy substantially all of an interstitial volume defined by the interstitial spaces.

These and other features, advantages, and objects of the present device will be further understood and appreciated by those skilled in the art upon studying the following specification, claims, and appended drawings.

DETAILED DESCRIPTION OF EMBODIMENTS

Figure 1:
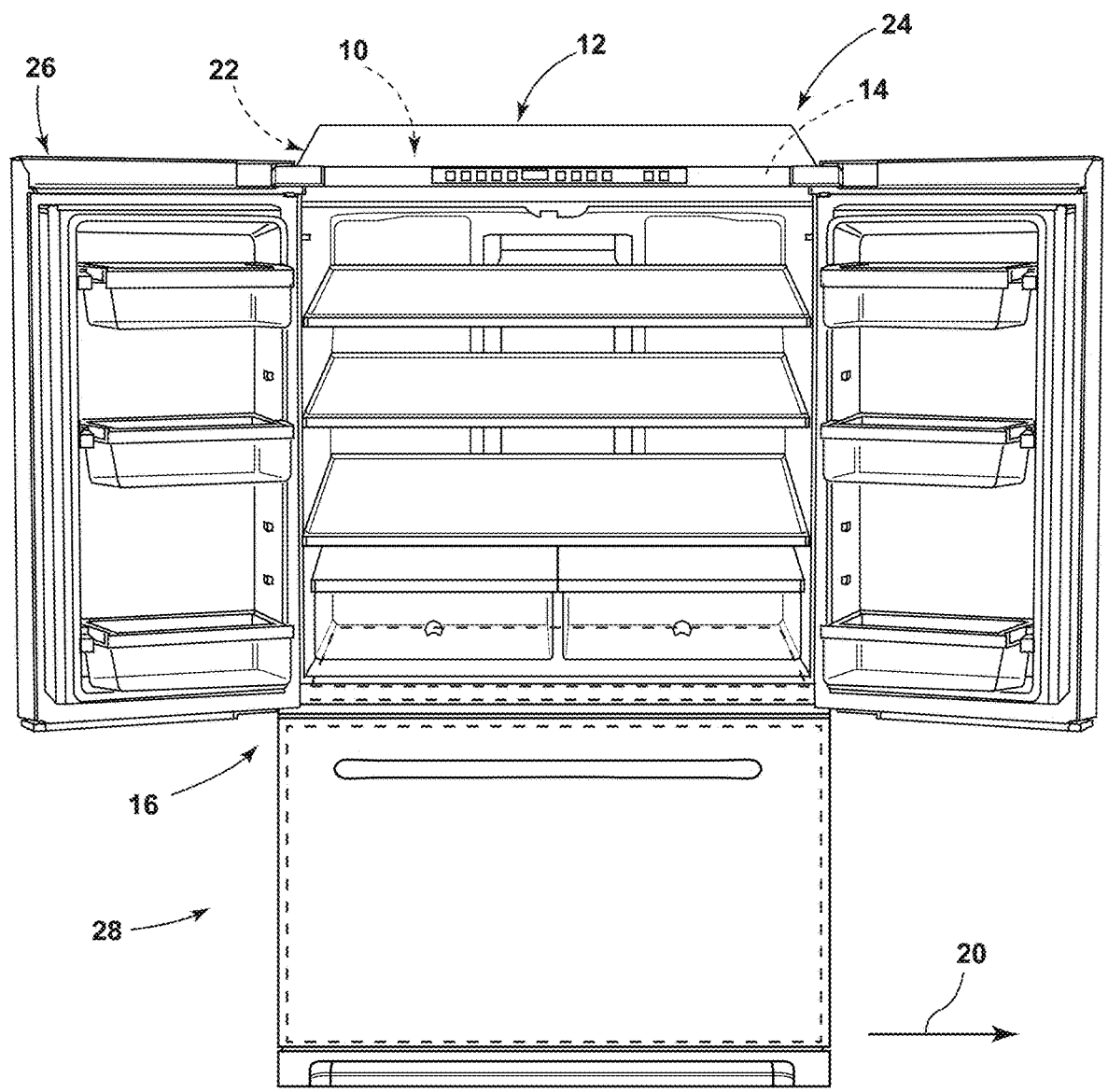
FIG. 1 is a front perspective view of an appliance incorporating a vacuum insulated structure made according to at least one aspect of a process for making a super-insulating core material for a vacuum insulated structure.
Figure 2:
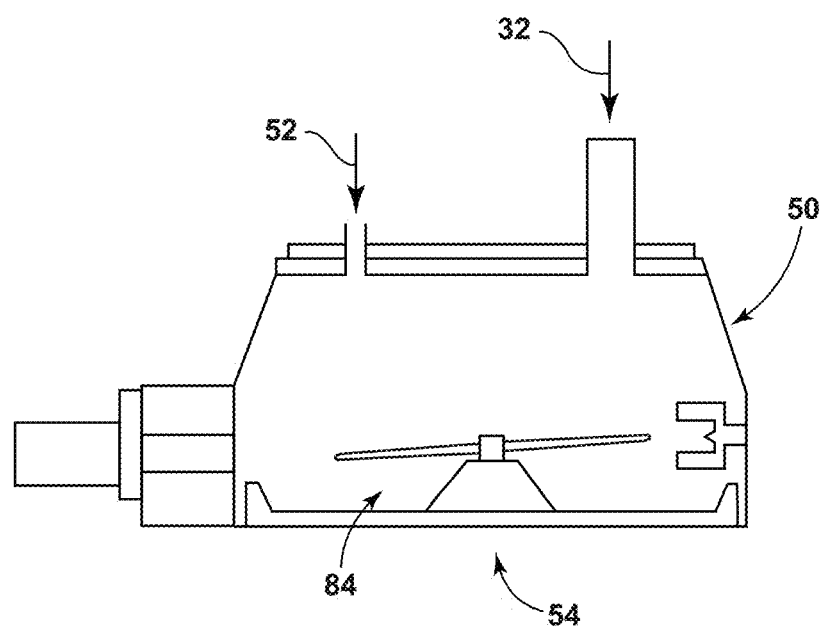
FIG. 2 is a schematic cross-sectional view of a mixing device used for making an aspect of the super-insulating material.
Figure 3:
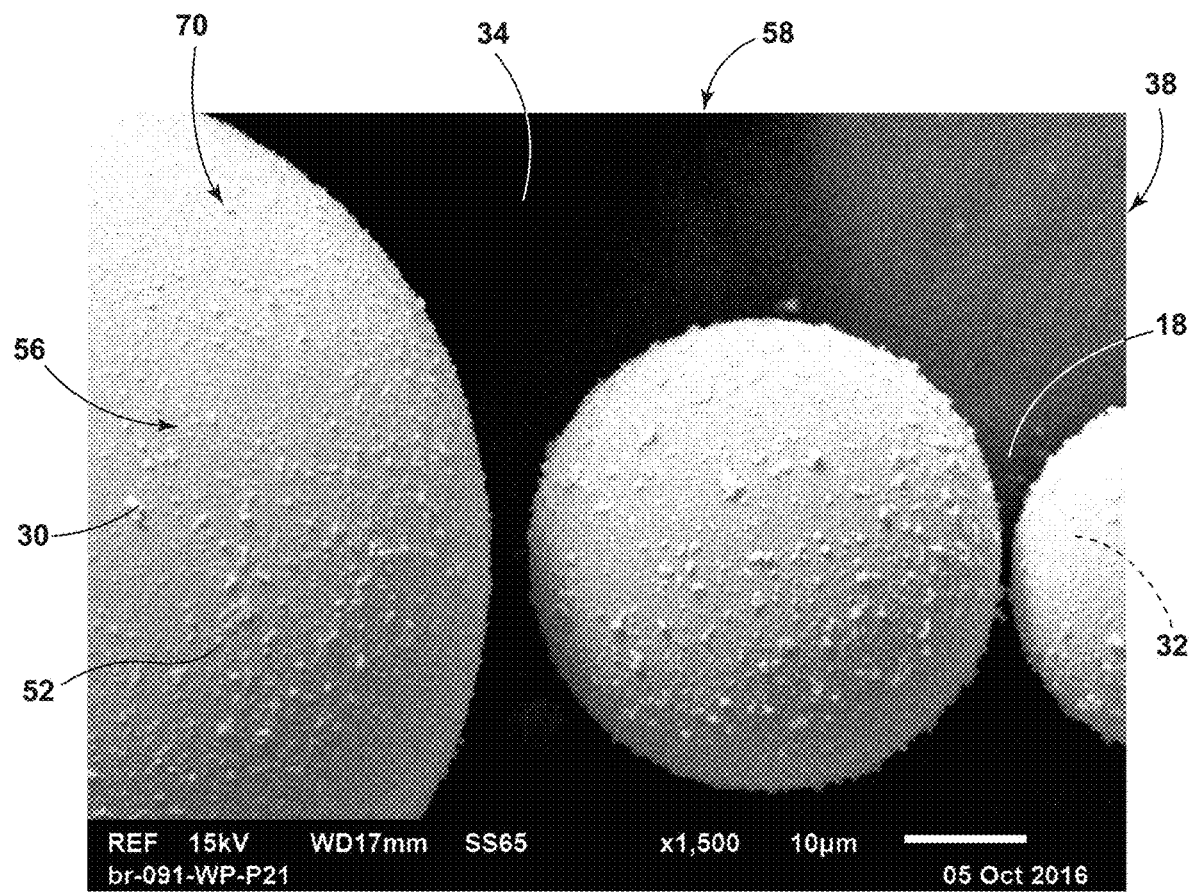
FIG. 3 is a perspective view of an aspect of the super-insulating core material in the form of an insulating base that includes at least one insulating material and at least one binding material.
Figure 4:
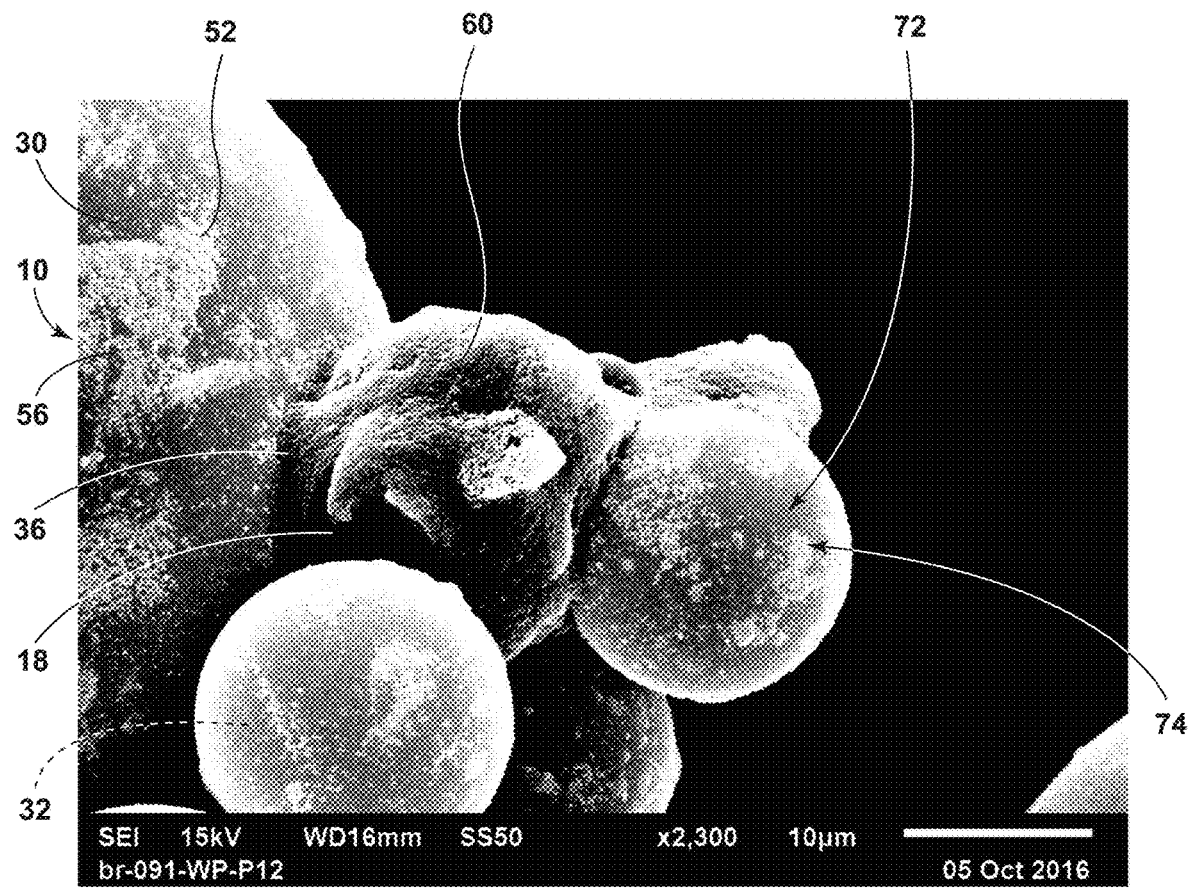
FIG. 4 is a perspective view of an aspect of the super-insulating core material shown with the insulating base combined with a secondary insulating material.
Figure 5:
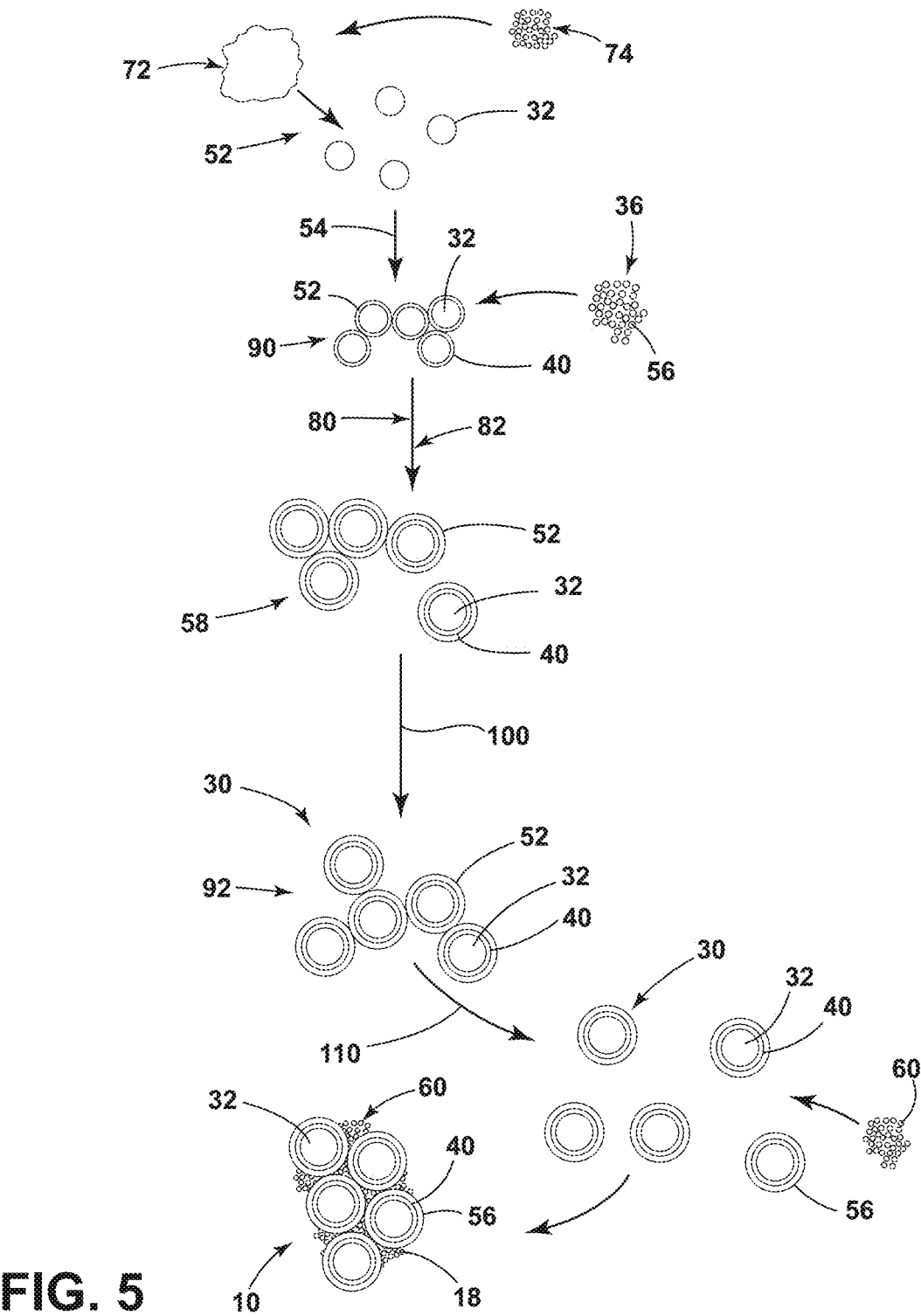
FIG. 5 is a schematic flow diagram illustrating a process for forming a super-insulating core material using a resin—based binder material and a plurality of insulating materials.
Figure 6:
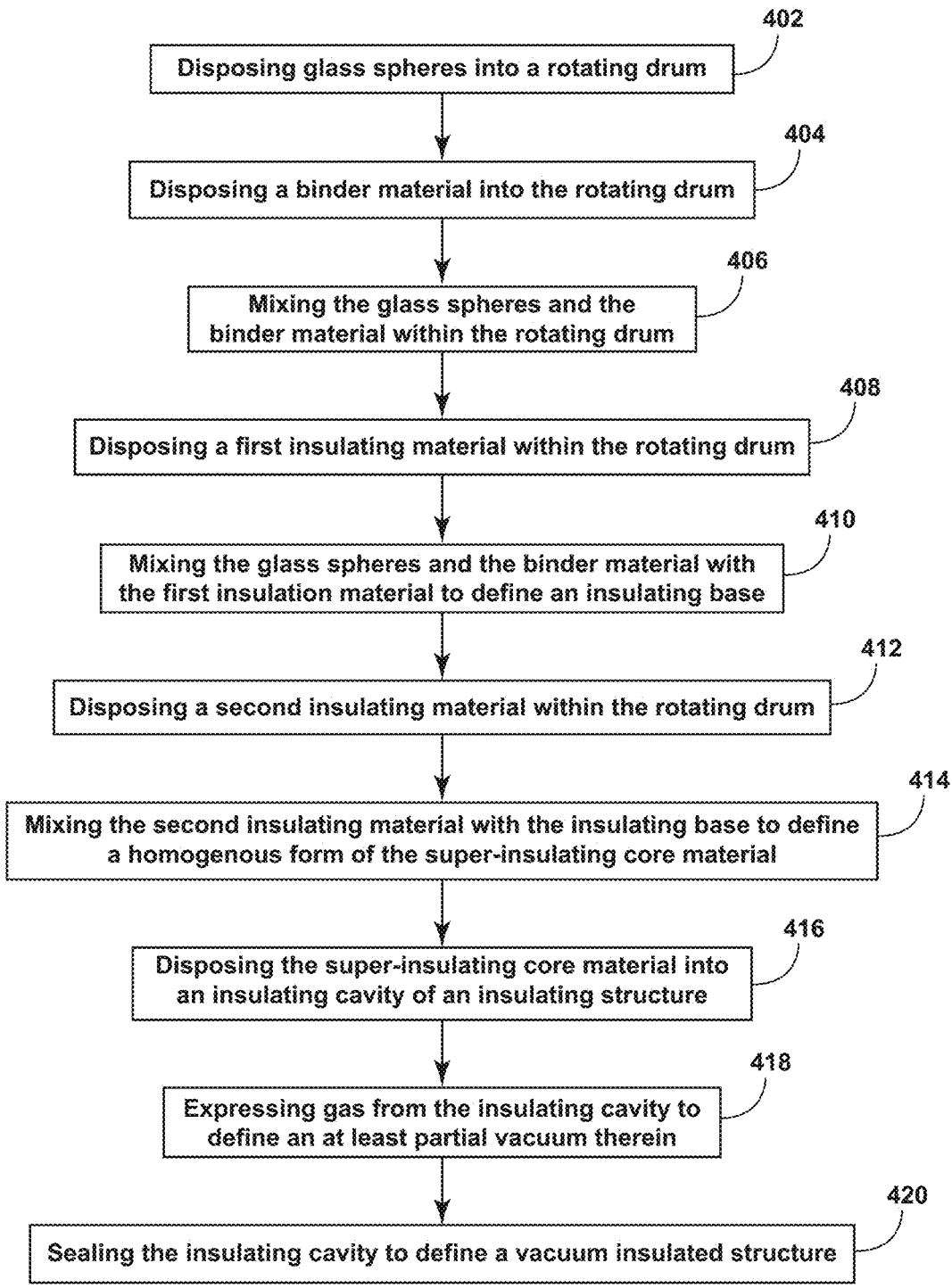
FIG. 6 is a schematic flow diagram illustrating a method for forming a super-insulating material for a vacuum insulated structure of an appliance.
Figure 7:
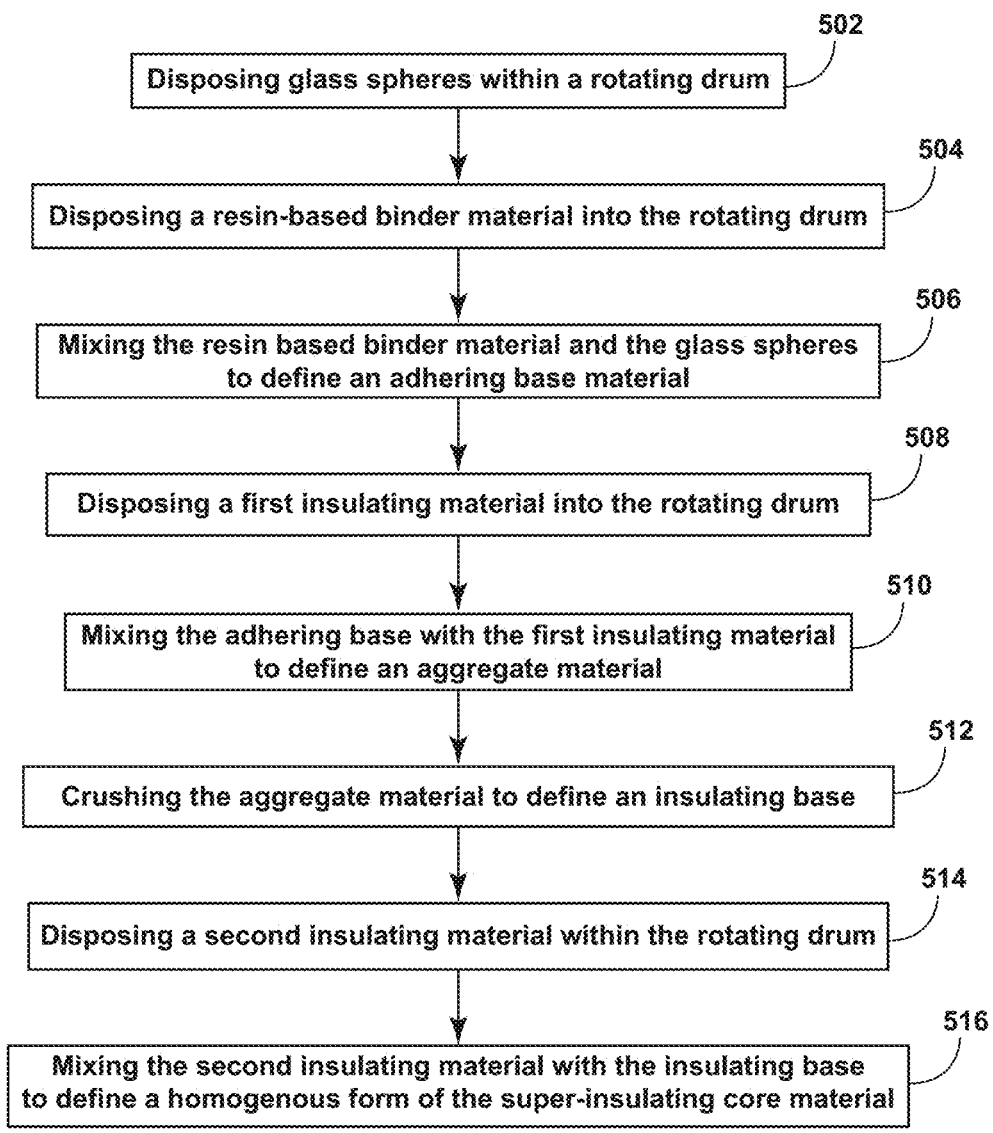
FIG. 7 is a schematic flow diagram illustrating a method for forming a super-insulating material for a vacuum insulated structure.
Figure 8:
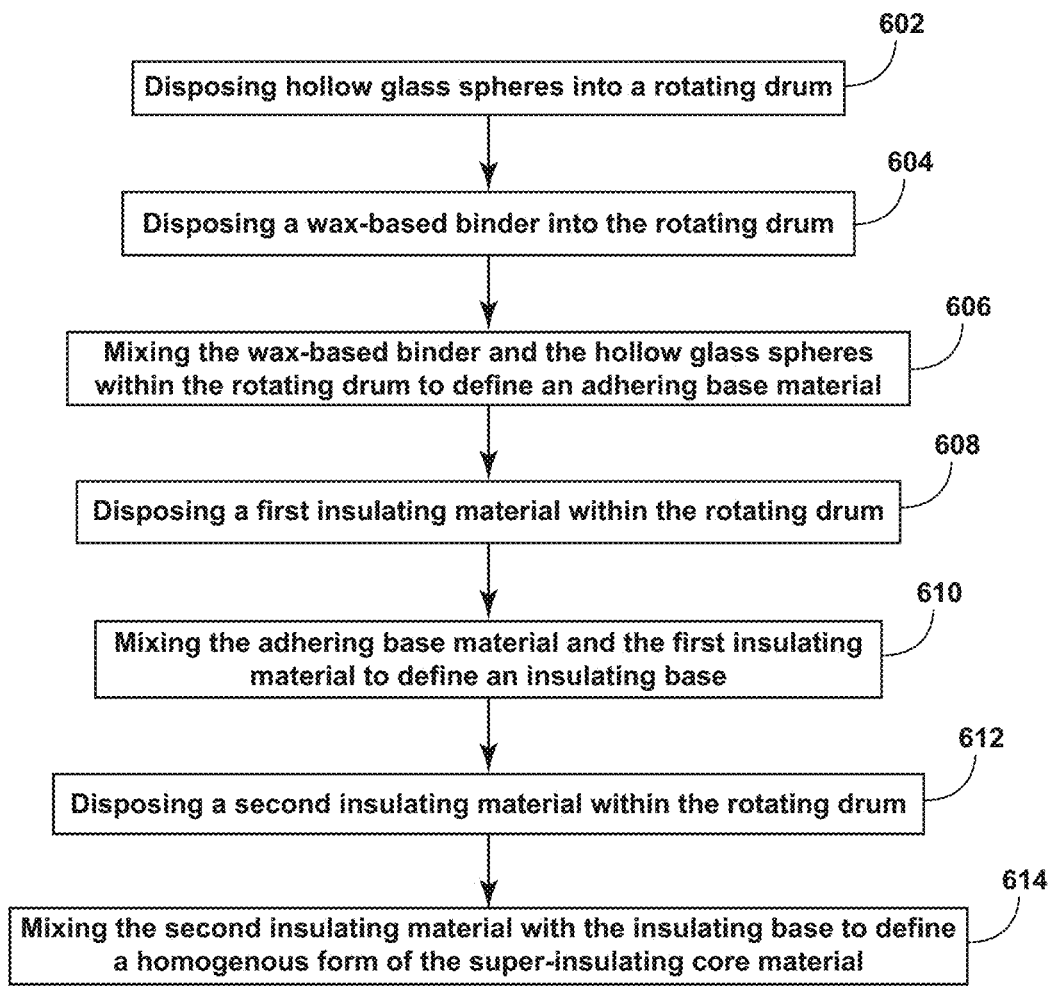
FIG. 8 is a schematic flow diagram illustrating a method for forming a super-insulating material for a vacuum insulated structure of an appliance.
Figure 9:
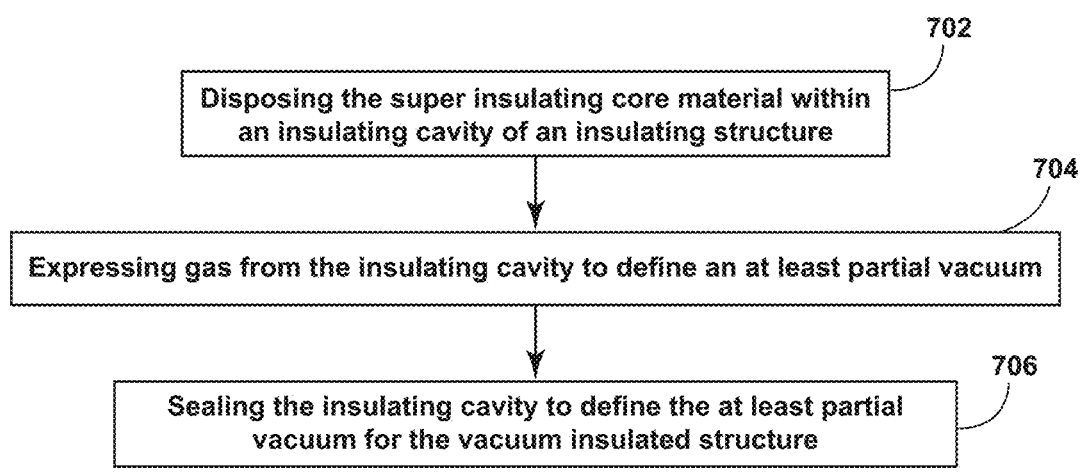
FIG. 9 is a schematic flow diagram illustrating a method for forming a vacuum insulated structure using a super-insulating material.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-9, reference numeral 10 generally refers to a super-insulating core material formed according to various processes used to form an insulating material 36 for use in a vacuum insulated structure 12. According to the various embodiments, the core material 10 can be formed through various methods and then disposed within an insulating cavity 14 of an insulating structure 16. After formation or substantial formation of the super-insulating core material 10, this core material 10 can be disposed within the insulating cavity 14. Where the material is sufficiently dense and includes minimal gaseous pores 18, the insulating structure 16 can be sealed to form the insulating structure 16 having the super-insulating core material 10 disposed therein. Typically, an additional step of expressing gas 20 from the insulating cavity 14 having the super-insulating core material 10 disposed therein can be conducted.

According to the various embodiments, the expression of gas 20 from the insulating cavity 14 defines an at least partial vacuum 22 within the insulating cavity 14 of the insulating structure 16. According to the various aspects of the processes for forming the super-insulating core material 10, core material 10 is sufficiently dense and has a sturdy structure that substantially resists inward compressive forces. Accordingly, minimal vacuum bow or inward deformation of the insulating structure 16 may be experienced as a result of the process of expression of gas 20 or other expulsion of gas 20 from the insulating cavity 14. The super-insulating core material 10, when disposed within the insulating cavity 14, has a robust structure and density that serves to resist the inward compressive force resulting from a pressure differential between the at least partial vacuum 22 within the insulating cavity 14 and the atmospheric pressure outside of the insulating structure 16. The super-insulating core material 10, because of the minimal pressure of pores 18, also has a lesser thermal transmission for an increased insulating performance.

Once a substantial amount of gas 20 is expressed from the insulating cavity 14, the insulating structure 16 can be sealed to define the vacuum insulated structure 12. The vacuum insulated structure 12 can be in the form of a vacuum insulated cabinet 24 or vacuum insulated panel 26 that may be used to insulate various appliances 28. These appliances 28 can typically include, but are not limited to, refrigerators, freezers, coolers, hot water heaters, ovens, laundry appliances, dishwashers, and other similar appliances 28 in both commercial and household settings. The term "expressed" is used to describe the removal of gas 20 from within the insulating cavity 14. It is contemplated that "expressed" also includes similar processes that involve the expulsion, suction, compression, or other similar removal of gas 20 from the insulating cavity 14 of the insulating structure 16.

The super-insulating core material 10 disclosed herein provides for a homogeneous coating 30 or substantially homogenous coating 30 that surrounds or substantially surrounds the entirety of each of the glass spheres 32. This homogeneous coating 30 around the glass spheres 32 allows for reduced inter-particle pore spacing, void spacing, or spacing between the various interstitial spaces 34 between the glass spheres 32. As the homogeneous coating 30 and the various insulating materials 36 adhere to and surround the glass spheres 32, the insulating materials 36 occupy all, or substantially all, of an interstitial volume 38 defined by the various interstitial spaces 34 between these glass spheres 32. By reducing inter-particle void spacing between the glass spheres 32, the super-insulating core material 10 can achieve a decreased thermal transmission. In various embodiments, a greater resistance to compressibility can also be realized that further results in diminished vacuum bow during the expression of gas 20 in forming the insulating structure 16.

Referring again to FIGS. 1-6, a method 400 is disclosed for forming a super-insulating core material 10 for use in a vacuum insulated structure 12 for an appliance 28. According to the method 400, glass spheres 32 are disposed within a rotating drum 50 (step 402). As discussed above, a plurality of interstitial spaces 34 are defined between the various glass spheres 32 within the rotating drum 50. At least one binder material 52 is also disposed within the rotating drum 50 (step 404). The glass spheres 32 and at least one binder material 52 are rotated within the rotating drum 50 (step 406). In this manner, the at least one binder material 52 is mixed with the glass spheres 32 during a first mixing stage 54. Accordingly, the at least one binder material 52 coats the entire outer surface of each glass sphere 32 or coats substantially all of the outer surface of each glass sphere 32. Accordingly, the binder material 52, in the form of a resin-based or wax-based coating 40, 42, partially occupies the interstitial spaces 34 between the glass spheres 32. A first insulating material 56 can then be disposed within the rotating drum 50 (step 408). The at least one binder material 52, the first insulating material 56 and the glass spheres 32 are mixed within the rotating drum 50 to define an insulating base 58 (step 410). The first insulating material 56 adheres to the at least one binder material 52 and forms at least a portion of the homogeneous coating 30 that surrounds each glass sphere. After forming the insulating base 58, the second insulating material 60 is disposed within the rotating drum 50 (step 412). The second insulating material 60 is then mixed with the insulating base 58 to define a homogenous or substantially homogenous form of the super-insulating core material 10 (step 414). In various embodiments of the method 400, the first and second insulating materials 56, 60 can be simultaneously disposed and mixed with the glass spheres 32 having the coating 30 of the binder material 52. Through this process, the first and second insulating materials 56, 60 serve to substantially occupy the interstitial spaces 34. Additionally, the first and second insulating materials 56, 60 also occupy substantially all of an interstitial volume 38 defined by the plurality of interstitial spaces 34. Typically, the glass spheres 32 of the super-insulating core material 10 are separated by the binder material 52 and the first insulating material 56. The interstitial spaces 34 defined between the particles of the insulating base 58 are then filled with the second insulating material 60 without adding or substantially adding to the overall volume of the insulating base 58. Accordingly, the amount of the second insulating material 60 added to the insulating base 58 is sufficient to fill the interstitial spaces 34, but not increase or substantially increase the overall volume of the super-insulating core material 10 beyond that of the overall volume of the insulating base 58.

Once the homogeneous form of the super-insulating core material 10 is formed, the super-insulating core material 10 can be disposed into an insulating cavity 14 of an insulating structure 16 (step 416). Gas 20 can then be expressed from the insulating cavity 14 to define an at least partial vacuum 22 within the insulating cavity 14 (step 418). Once the appropriate level of vacuum 22 is achieved within the insulating cavity 14, the method 400 can include a step of sealing the insulating cavity 14 to define the insulating structure 16 (step 420).

Referring again to FIGS. 1-5, various binder materials 52 can be used in forming the super-insulating core material 10. Such binder materials 52 can include, but are not limited to, wax-based binders 70, resin-based binders 72, binder materials 52 combined with hardening agents 74, combinations thereof, and other similar binder materials 52. By way of example, and not limitation, one such wax-based binder 70 can be in the form of polyethylene glycol (PEG) 1500. By way of further example, a resin-based binder material 52 can be in the form of SK Resin 1651. It should be understood that other types and forms of binder materials 52 including wax and resin-based binders 70, 72 can be used in the formation of the super-insulating core material 10. It is also contemplated that different processes may be used in forming the super-insulating core material 10 when using a wax-based binder material 52 or a resin-based binder material 52. Exemplary processes for each of these types of binder materials 52 will be discussed in greater detail below.

Referring again to FIGS. 1-5, it is contemplated that the first insulating material 56 can be in the form of various fine-particle insulating materials 36. These insulating materials 36 can include, but are not limited to, carbon black, silica-based material, nano-spheres, powdered perlite, fibrous-type materials, various organic and/or inorganic materials, combinations thereof and other similar micro- or nano-particulate matter. Typically, carbon black is used as the first insulating material 56. According to the various embodiments, the carbon black adheres to the binder material 52 to define the insulating base 58.

Referring again to FIGS. 1-5, it is contemplated that the second insulating material 60 can be any one of various insulating materials 36 that can include, but are not limited to, silica-based materials, glass fiber, powdered perlite, other forms of perlite, fibrous micro-sized materials, fibrous nano-sized materials, fumed silica, precipitated silica, granular aerogels, micro/nano hollow organic and inorganic spheres, rice husk ash, various opacifiers, fibrous insulating material, combinations thereof, and other similar insulating materials 36 that can be mixed with the insulating base 58 to occupy the various interstitial spaces 34 between the glass spheres 32 of the insulating base 58. Additionally, the glass spheres 32 used in forming the super-insulating core material 10 can be in the form of hollow spheres, solid spheres, nano-sized spheres, micro-sized spheres, hollow spheres filled with insulating gas 20, hollow spheres that contain an at least partial vacuum 22, combinations thereof and other similar formulations of glass spheres 32.

Referring again to FIGS. 1-8, according to the various aspects of the methods described herein, the step of mixing the at least one binder material 52, the first insulating material 56 and the glass spheres 32 can include multiple mixing stages. These mixing stages can typically include a second mixing stage 80 and a third mixing stage 82. According to the various embodiments, the second mixing stage 80 can be in the form of a low-speed mixing stage that includes rotating a mixing attachment 84 at a speed of from approximately 3.8 meters per second to approximately 6.7 meters per second. Additionally, the low-speed mixing stage can also be described as a short-term mixing stage. In this short-term mixing stage, the mixing attachment 84 can be operated for approximately two minutes at the range of speeds noted above. Once the second mixing stage 80 is complete, the third mixing stage 82 can be initiated and performed either immediately or after a predetermined rest period. During this third mixing stage 82, which can be described as a high-speed mixing stage and a long-term mixing stage, the mixing attachment 84 can be operated at a speed of from approximately 11.3 meters per second to approximately 12.6 meters per second and for a time period that lasts from approximately 5 minutes to approximately 8.5 minutes. While other speeds and time periods may be used during this mixing stage, these times and speeds have been found to produce an insulating base 58 having the desired homogeneous coating 30 of the binder material 52 and the first insulating material 56.

Referring now to FIGS. 1-5 and 7, a method 500 is disclosed for forming a super-insulating core material 10 for a vacuum insulated structure 12 that can be used in an appliance 28. According to the method 500, glass spheres 32 can be disposed within a rotating drum 50 (step 502). As discussed above, a plurality of interstitial spaces 34 is defined between each of the glass spheres 32. A resin-based binder material 52 can then be disposed within the rotating drum 50 (step 504). It is contemplated that the resin-based binder 72 can include a resin-based material as well as a hardening agent 74 that combine to form the resin-based binder 72. Typically, the resin based-binder 72 which can be in the form of a viscous material can be mixed with the hardening agent 74, such as a powder-based hardener, within a separate mixing apparatus. The hardening agent 74 activates the resin-based binder 72. The resin-based binder 72 that is mixed with the hardening agent 74 may be mixed in a separate mixing apparatus. When mixed, the resin-based binder 72 is activated and begins to harden into a resin-based coating 40 that will be disposed around the entirety of each of the glass spheres 32 or substantially all of the outer surface of the glass spheres 32. Once mixed to define the resin-based coating 40, the combined resin-based binder 72 and hardening agent 74 are disposed within the rotating drum 50. It is contemplated that other resin-based binders 72 may be used that may not require an additional hardening agent 74. According to the method 500, the glass spheres 32 and the resin-based coating 40 are mixed during a first mixing stage 54 to define an adhering base material 90 (step 506). Within the adhering base material 90, the interstitial spaces 34 between the glass spheres 32 is at least partially occupied by the resin-based coating 40. During this mixing stage, the resin-based coating 40 and the glass spheres 32 can be mixed such that the mixing attachment 84 is rotated at a speed of approximately 3.8 meters per second, for a time period of approximately three minutes. As discussed above, these times and speeds are exemplary, but have produced a desired result in the form of a coated glass sphere that defines the adhering base material 90. The resin-based coating 40 can be at least partially tacky or adhesive such that the adhering base material 90 may form loosely formed agglomerates of coated glass spheres 32. This adhering base material 90 can be readily broken apart and reformed into other formations of loosely formed agglomerates during the various mixing stages as the resin-based coating 40 hardens.

Referring again to FIGS. 1-5 and 7, once the adhering base material 90 is formed, the first insulating material 56 can be disposed within the rotating drum 50 (step 508). The first insulating material 56 can be any one of those materials described above. Typically, the first insulating material 56 will include carbon black. The adhering base material 90 is then mixed with the first insulating material 56 to define an aggregate material 92 (step 510). Again, as the agglomerates of the adhering base material 90 are mixed, the agglomerates can easily be broken up into other formations of agglomerates. During this mixing process, the first insulating material 56 is able to adhere to the entire outer surface of the coated glass spheres 32. As the agglomerates of the adhering base material 90 are separated and reformed, the first insulating material 56 is able to coat the entire outer surface of the resin-coated glass spheres 32. The formation of this aggregate material 92 can be formed by mixing the adhering base material 90 with the first insulating material 56 in second and third mixing stages 80, 82. Where the resin-based binder 72 is used, the second mixing stage 80 can be performed by rotating the mixing attachment 84 at approximately 3.8 meters per second for approximately two minutes. Subsequently, the third mixing stage 82 can be performed through rotating the mixing attachment 84 at approximately 11.3 meters per second for approximately 5 minutes. At the completion of the second and third mixing stages 80, 82, the aggregate material 92 is defined by agglomerates of glass spheres 32 that are completely and evenly coated by the resin-based coating 40 and the first insulating material 56. The aggregate material 92, similar to the adhering base material 90 is formed into loosely adhered formations that can readily be separated and reformed during the second and third mixing stages 80, 82. During the second and third mixing stages 80, 82, the resin-based coating 40 continues to harden into its final solid form.

Referring again to FIGS. 1-5 and 7, after the aggregate material 92 is formed, the aggregate material 92 can be crushed during a crushing stage 110 to define the insulating base 58 (step 512). The crushing stage 110 can be a controlled operation that can occur within the mixer. Such crushing can occur by rotating the mixing attachment 84 at a speed of approximately 11.3 meters per second for a time period of approximately 5 minutes. Through the crushing stage 110, the particles of the aggregate material 92 are crushed into a desired consistent particle size to define the insulating base 58. Accordingly, the speed that the mixing attachment 84 is operated at and the time period of operation can vary to achieve various particle sizes. Typically, the desired particle size will be such that all or substantially all of the glass spheres 32 having the resin-based coating 40 and the first insulating material 56 are separated and no agglomerates or substantially no agglomerates remain within the insulating base 58.

According to various embodiments, the step 510 of mixing the insulating base 58 with the first insulating material 56 to define the aggregate material 92, can include a fourth mixing stage 100 that may further define the aggregate material 92 or aggregate base. This fourth mixing stage 100 can include an inspected mixing stage wherein the aggregate material 92 is mixed and inspected to ensure that each of the glass spheres 32 of the insulating base 58 is coated evenly and completely with the first insulating material 56. During this inspected fourth mixing stage 100, the resin-based coating 40 is not completely hardened. Accordingly, the aggregates of coated glass spheres 32 remain loosely packed such that the aggregates of the aggregate material 92 can readily be broken apart and reformed. During this process of breaking apart and reforming the aggregates of coated glass spheres 32, the first insulating material 56 is able to adhere evenly and completely around each coated glass sphere 32 of the aggregate material 92. Once the inspected fourth mixing stage 100 is complete, the resin-based coating 40 is typically completely hardened. In the hardened state, the agglomerates of the aggregate material 92 remain only loosely formed such that the crushing stage 110 can serve to completely separate the aggregate material 92 into the insulating base 58 of evenly coated glass spheres 32 that are evenly and completely coated, or substantially coated by the resin-based coating 40 and the first insulating material 56. The inspected fourth mixing stage 100 can be performed manually by hand to allow for in-person inspection. The inspected fourth mixing stage 100 can also be performed by a mechanical mixer. Where a mechanical mixer is used, inspection of the process can be accomplished in person, via video monitoring, through the use of various sensing mechanisms, combinations thereof, or through other similar inspection mechanisms. Through the inspected fourth mixing stage 100 of the aggregate material 92, each surface, or substantially each surface, of the particles of the aggregate material 92 can be exposed to the air and also the first insulating material 56 within the rotating drum to assist in drying, curing or hardening the resin-based binder material 52 and also coating each glass sphere 32 with the first insulating material 56. This inspected fourth mixing stage 100 may typically be conducted for approximately 30 minutes.

Referring again to FIGS. 1-5 and 7, once the crushing stage 110 is complete, a second insulating material 60 is disposed within a rotating drum 50 (step 514). The second insulating material 60 is then mixed with the insulating base 58 to define a homogeneous form of a super-insulating core material 10 (step 516). It is contemplated that the first and second insulating materials 56, 60 serve to substantially occupy all of an interstitial volume 38 defined by the plurality of interstitial spaces 34 between the glass spheres 32. In this manner, the size and amount of air gaps or pores 18 between the particles of the super-insulating core material 10 can be minimized to decrease thermal conductivity and, in certain embodiments, also increase the material's resistance to compaction as a result of vacuum bow. It is contemplated that the addition of the second insulating material 60 serves to only occupy the interstitial spaces 34 and the interstitial volume 38. Typically, the addition of the second insulating material 60 will not add to the overall volume of the insulating base 58. Rather, the second insulating material 60 fits within the interstitial spaces 34 such that each coated glass sphere 32 of the insulating base 58 remains in contact with the adjacent coated glass spheres 32 of the aggregate base 58. In this manner, the addition of the second insulating material 60 serves to only supplement the thermal transmission resistance of the super-insulating core material 10. Through this process, the homogenous form of the super-insulating core material 10 is defined by the coated glass spheres 32 that are each below a predetermined insulating particle size. It is also contemplated that through these processes, the super-insulating core material 10 is a pourable and free-flowing insulating core material 10. The glass spheres 32 of the super-insulating core material 10 are separated by the binder material 52 and the first insulating material 56. The interstitial spaces 34 defined between the particles of the insulating base 58 are then filled with the second insulating material 60 without adding or substantially adding to the overall volume of the insulating base 58.

According to various embodiments, the finish mixing stage of step 516, where the second insulating material 60 is combined with the insulating base 58, the mixing attachment 84 can be operated at speeds that range from approximately 11.3 meters per second to approximately 12.6 meters per second. Additionally, the mixing attachment 84 can be operated at these speeds for a time period of approximately 2.5 minutes to approximately 5 minutes. Through these processes, the particles of the super-insulating core material 10 are defined by coated glass spheres 32 that are free flowing with little to no large aggregates included. The absence of large aggregates serves to maximize the mixability and pourability of the super-insulating core material 10 and also minimize the size and presence of pores 18 or air gaps between the particles of the super-insulating core material 10.

Referring now to FIGS. 1-4 and 8, a method 600 is disclosed for forming a super-insulating core material 10 for use in a vacuum insulated structure 12 for an appliance 28. According to this method 600, hollow glass spheres 32 can be disposed within a rotating drum 50 (step 602). As discussed previously, a plurality of interstitial spaces 34 are defined between each of the hollow glass spheres 32. These interstitial spaces 34 collectively define an interstitial volume 38 that is defined between the plurality of hollow glass spheres 32 contained within the rotating drum 50. According to method 600, a wax-based binder 70 is disposed within the rotating drum 50 (step 604). The wax-based binder 70 is disposed in the rotating drum 50 while in a melt state such that the wax-based binder 70 will cover and define a wax-based coating 42 of the adhering base material 90. The melt state of the wax-based binder 70 can include a heated form of the wax-based binder 70. As the wax-based binder 70 and the glass spheres 32 are mixed, the wax-based binder 70 cools and hardens to define a wax-based coating 42 that consistently and completely covers each glass sphere 32 to define the adhering base material 90. The adhering base material 90 is typically a free-flowing material where the glass spheres 23 of the adhering base material 90 having the wax-based coating 42 do not stick to one another. The hollow glass spheres 32 and the wax-based binder 70 are mixed within the rotating drum 50 (step 606). The wax-based binder 70 is mixed with the hollow glass spheres 32 during the first mixing stage 54 such that the wax-based binder 70 partially occupies a portion of the interstitial spaces 34. In this manner, the wax-based binder 70 and the hollow glass spheres 32 define the adhering base material 90. During this first mixing stage 54, it is contemplated that the mixing attachment 84 can be rotated at a speed of from approximately 3.8 meters per second to approximately 6.7 meters per second. This mixing attachment 84 can be operated for a time period of from approximately two minutes to approximately three minutes. Again, the speeds and times of operating the mixing attachment 84 can vary depending on the binder material 52 used. For a wax-based binder 70, the mixing attachment 84 is operated during the first mixing stage 54 of a speed of approximately 6.7 meters per second and for approximately two minutes.

Referring again to FIGS. 1-4 and 8, once the adhering base material 90 is formed, the first insulating material 56 can be disposed within the rotating drum 50 (step 608). The adhering base material 90 is then mixed with the first insulating material 56 to define an insulating base 58 (step 610). As discussed above, this mixing stage can be separated into a second mixing stage 80 and the third mixing stage 82. In this second mixing stage 80, the mixing attachment 84 can be operated at a speed of from approximately 3.8 meters per second to approximately 6.7 meters per second and at a time period of approximately two minutes. In the third mixing stage 82, the mixing attachment 84 can be operated at a speed of from approximately 11.3 meters per second to 12.6 meters per second. The time period of the third mixing stage 82 can be any time period of from approximately 5 minutes to approximately 8.5 minutes.

According to the method 600, once the insulating base 58 is formed, the second insulating material 60 is disposed within the rotating drum 50 (step 612). The second insulating material 60 is then mixed with the insulating base 58 to define a homogeneous form of the super-insulating core material 10 (step 614). The amount of the second insulating material 60 that is added to the insulating base 58 is typically an amount sufficient to fully occupy or substantially occupy the remainder of the interstitial spaces 34 between the glass spheres 32. Accordingly, the volume of the insulating base 58 is substantially the same as the overall volume of the super-insulating core material 10. The second insulating material 60 is mixed with the insulating base 58 by rotating the mixing attachment 84 at a speed of from approximately 11.3 meters per second to approximately 12.6 meters per second. This mixing stage can be conducted for a time period of from approximately 2.5 minutes to approximately 5 minutes. In various embodiments, the first and second insulating materials 56, 60 can be added simultaneously. In such an embodiment, the time and speed of the various mixing steps may remain the same to properly mix the first and second insulating materials 56, 60 to define the super-insulating core material 10. The variations in the speed and time period of the various mixing stages can be based upon the material used for the binder material 52 to form the super-insulating material 36, the size of the glass spheres 32, the configuration of the glass spheres 32, the material used for the first and/or second insulating materials 56, 60, and other similar considerations and factors.

Referring again to FIGS. 1-9, when the super-insulating core material 10 is formed according to the various methods 400, 500, 600 described herein, as well as aspects of these methods, the final result is a super-insulating core material 10 that is in the form of a pourable free-flowing insulating material 36. Additionally, this super-insulating core material 10 is in the form of a homogeneous super-insulating core material 10 that is defined by coated glass spheres 32 and where the particles of the super-insulating core material 10 are typically below a predetermined insulating particle size.

The exact size of the particle used for the super-insulating core material 10 can vary depending upon the insulating structure 16 being formed, the desired thermal conductivity to be used in the insulating structure 16, and other similar considerations.

It is contemplated that the insulating structure 16 into which the super-insulating core material 10 can be disposed can be an insulating panel 26 or can be an insulating structure 16 such as an appliance cabinet 24 that includes an outer wrapper and an inner liner that are attached to define the insulating cavity 14 therein. In the case of the insulating panel 26 and the insulating structure 16, it is contemplated that an at least partial vacuum 22 can be formed within the respective insulating cavity 14. Accordingly, the super-insulating structure 16 can be used to form a vacuum-insulated structure.

It is also contemplated that the super-insulating core material 10 can be physically packed without the use of a vacuum 22 such that the super-insulating core material 10 packed within the insulating structure 16 achieves the desired thermal conductivity without the expression of gas 20. Typically, it is contemplated that at least a portion of the gas 20 within the insulating structure 16 will be expressed such that an at least partial vacuum 22 is formed within the insulating structure 16.

Referring again to FIGS. 1-9, after the super-insulating core material 10 is formed according to the various aspects of the methods 400, 500 and 600, a method 700 can be used for disposing the super-insulating core material 10 within an insulating structure 16. According to the method 700, a super-insulating core material 10 can be disposed within an insulating cavity of an insulating structure 16 (step 702). As discussed above, the insulating structure 16 can be in the form of an insulating panel 26 or an insulating structure 16 such as that used for a cabinet 24 of an appliance 28. It is also contemplated that an insulating panel 26 can be inserted within the cabinet 24 as a portion of the insulating structure 16 for the cabinet 24 of the appliance 28. After the super-insulating material 36 is disposed into the insulating cavity 14 of the insulating structure 16, gas 20 can be expressed from the insulating cavity 14 to define an at least partial vacuum 22 within the insulating cavity 14 (step 704). The insulating cavity 14 can be sealed to define the at least partial vacuum 22 for the vacuum insulated structure 12 (step 706).

According to the various embodiments, it is contemplated that depending upon the design of the super-insulating core material 10, the various steps included within methods 400, 500 and 600 may be reordered as necessary depending upon the desired formulation of the super-insulating core material 10. It is also contemplated that the mixing attachment 84 may be operated at speeds greater than or less than the speeds indicated therein and for time periods that are longer or shorter than the time periods described herein according to the various aspects of the methods 400, 500 and 600 where larger or smaller particles sizes of the core material 10 are desired.

According to the various embodiments, the mixing attachment 84 can be any one of various mixing attachments 84 that can stir, blend, crush manipulate or otherwise process the various aspects of the super-insulating core material 10. The mixer that operates the mixing attachment 84 can be any one of the various mixers. By way of example, and not limitation, such a mixer can be various models of Eirich mixer that can be used for mixing and otherwise processing micro- and nano-sized particles for forming the super-insulating core material 10.

According to the various embodiments, the various methods 400, 500 and 600 and aspects thereof are designed to produce a homogeneous coating 30 around the various glass spheres 32 to eliminate voids defined by the interstitial spaces 34 defined between the glass spheres 32. By eliminating these voids, the super-insulating core material 10 has a reduced thermal conductivity that increases the insulating capability of the super-insulating core material 10 and also the insulating structure 16 within which the super-insulating core material 10 is disposed.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method for forming a free-flowing insulating material, the method comprising steps of:
    disposing glass spheres within a rotating drum;
    disposing at least one binder material within the rotating drum;
    rotating the glass spheres and the at least one binder material within the rotating drum, wherein the at least one binder material is mixed with the glass spheres during a first mixing stage to partially occupy a plurality of interstitial spaces defined between the glass spheres;
    disposing a first insulating material within the rotating drum;
    mixing the at least one binder material, the first insulating material and the glass spheres to define an insulating base;
    disposing a second insulating material within the rotating drum; and
    mixing the second insulating material with the insulating base to define a homogenous form of a super-insulating material, wherein the first and second insulating materials occupy substantially all of an interstitial volume defined by the plurality of interstitial spaces.

2. The method of claim 1, wherein the step of mixing the at least one binder material, the first insulating material and the glass spheres includes second and third mixing stages.

3. The method of claim 2, wherein the second mixing stage is a low-speed mixing stage.

4. The method of claim 2, wherein the third mixing stage is a high-speed mixing stage.

5. The method of claim 2, wherein the step of mixing the at least one binder material, the first insulating material and the glass spheres includes a fourth mixing stage, the fourth mixing stage including manually mixing the at least one binder material, the first insulating material and the glass spheres to at least partially define the insulating base, wherein manual mixing provides engagement between the insulating base and air surrounding the insulating base.

6. The method of claim 5, wherein the fourth mixing stage includes mixing and visually inspecting the at least one binder material, the first insulating material and the glass spheres for approximately 30 minutes.

7. The method of claim 5, wherein the step of mixing the at least one binder material, the first insulating material and the glass spheres includes a crushing stage that takes place after the fourth mixing stage, wherein the crushing stage serves to define the insulating base.

8. The method of claim 1, wherein the step of disposing the at least one binder material within the rotating drum includes disposing a resin-based binding material and a hardening agent within the rotating drum.

9. The method of claim 1, wherein the homogenous form of the super-insulating material is defined by coated glass spheres that are each below a predetermined insulating particle size.

10. A method for forming a pourable insulating material, the method comprising steps of:
   disposing glass spheres within a rotating drum;
   disposing a binding material within the rotating drum;
   mixing the glass spheres and the binding material during a first mixing stage to define an adhering base material, wherein a plurality of interstitial spaces defined between the glass spheres are partially occupied by the binding material;
   disposing a first insulating material within the rotating drum;
   mixing the adhering base material with the first insulating material to define an aggregate material;
   crushing the aggregate material during a crushing stage to define an insulating base;
   disposing a second insulating material within the rotating drum; and
   mixing the second insulating material with the insulating base to define a homogenous form of a super-insulating material, wherein the first and second insulating materials occupy substantially all of an interstitial volume defined by the plurality of interstitial spaces.

11. The method of claim 10, wherein the step of mixing the adhering base material and the first insulating material includes second and third mixing stages.

12. The method of claim 11, wherein the second mixing stage is a short-term mixing stage.

13. The method of claim 11, wherein the third mixing stage is a long-term mixing stage.

14. The method of claim 10, further comprising:
   mixing the aggregate material during an inspected mixing stage, wherein the inspected mixing stage exposes substantially each surface of the aggregate material to air within the rotating drum.

15. The method of claim 14, wherein the inspected mixing stage includes manually mixing the aggregate material for approximately 30 minutes.

16. The method of claim 10, wherein the homogenous form of the super-insulating material is defined by coated glass spheres that are each below a predetermined insulating particle size.

17. A method for forming a free-flowing insulating material, the method comprising steps of:
   disposing hollow glass spheres within a rotating drum;
   disposing a wax-based binder material within the rotating drum;
   mixing the hollow glass spheres and the wax-based binder material within the rotating drum, wherein the wax-based binder material is mixed during a first mixing stage with the hollow glass spheres to partially occupy a plurality of interstitial spaces between the hollow glass spheres and define an adhering base material;
   disposing a first insulating material within the rotating drum;
   mixing the adhering base material with the first insulating material to define an insulating base;
   disposing a second insulating material within the rotating drum; and
   mixing the second insulating material with the insulating base to define a homogenous form of a super-insulating material, wherein the first and second insulating materials occupy substantially all of an interstitial volume defined by the plurality of interstitial spaces.

18. The method of claim 17, wherein the step of mixing the adhering base material and the first insulating material includes second and third mixing stages.

19. The method of claim 18, wherein the second mixing stage is a low-speed mixing stage and the third mixing stage is a high-speed mixing stage.

20. The method of claim 17, wherein the homogenous form of the super-insulating material is defined by coated glass spheres that are each below a predetermined insulating particle size, and wherein the super-insulating material is a pourable free flowing insulating material.

\* \* \* \* \*